United States Patent
Huang

(10) Patent No.: US 10,072,818 B1
(45) Date of Patent: Sep. 11, 2018

(54) LIGHT-SPREADING LENS FOR LIGHT SOURCE

(71) Applicant: HON HAI PRECISION INDUSTRY CO., LTD., New Taipei (TW)

(72) Inventor: Chien-Feng Huang, New Taipei (TW)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 0 days.

(21) Appl. No.: 15/641,414

(22) Filed: Jul. 5, 2017

(30) Foreign Application Priority Data

Jun. 14, 2017 (CN) .......................... 2017 1 0448861

(51) Int. Cl.
*F21V 5/04* (2006.01)
*F21Y 115/10* (2016.01)

(52) U.S. Cl.
CPC ............ *F21V 5/046* (2013.01); *F21Y 2115/10* (2016.08)

(58) Field of Classification Search
CPC ...................................................... F21V 5/046
USPC .......................................................... 362/335
See application file for complete search history.

(56) References Cited

U.S. PATENT DOCUMENTS

| | | | | |
|---|---|---|---|---|
| 6,724,543 B1* | 4/2004 | Chinniah | ............ | F21S 48/2212 359/718 |
| 7,422,347 B2* | 9/2008 | Miyairi | ............ | A47F 3/001 257/E33.073 |
| 7,798,679 B2* | 9/2010 | Kokubo | ............ | G02B 19/0014 362/334 |
| 7,963,680 B2* | 6/2011 | Yoon | ............ | F21V 5/04 362/336 |
| 8,967,833 B2* | 3/2015 | Wang | ............ | F21V 5/04 359/708 |
| 9,169,992 B2* | 10/2015 | Wang He | ............ | F21V 5/048 |
| 9,593,827 B2* | 3/2017 | Ji | ............ | F21V 13/04 |
| 2010/0259706 A1* | 10/2010 | Kuwaharada | ............ | F21V 5/04 349/62 |
| 2013/0320843 A1* | 12/2013 | Lee | ............ | F21V 5/045 313/512 |
| 2015/0078008 A1* | 3/2015 | Wang He | ............ | F21V 5/045 362/311.06 |
| 2016/0109092 A1* | 4/2016 | Ikeda | ............ | G02B 19/0061 362/336 |
| 2017/0122523 A1* | 5/2017 | Li | ............ | F21V 5/04 |

* cited by examiner

*Primary Examiner* — Bryon T Gyllstrom
(74) *Attorney, Agent, or Firm* — ScienBiziP, P.C.

(57) ABSTRACT

An light-spreading lens comprises a bottom surface, a light-in surface, a side surface, a light-out surface and a micro structure portion. The light-in surface is defined in a center of the bottom surface and is recessed away from the bottom surface to form a receiving chamber. The side surface is around the bottom surface and is perpendicular to the bottom surface. The light-out surface extends from the side surface along a direction away from the bottom surface. The micro structure portion is formed on the light-out surface and is around a periphery of the light-out surface of near the side surface.

18 Claims, 4 Drawing Sheets

LIGHT-SPREADING LENS FOR LIGHT SOURCE

FIELD

The subject matter herein generally relates to a light-spreading lens for increasing an emitting angle of a light emitting diode chip.

BACKGROUND

An emitting angle of a light emitting diode chip is 0-120°. However, 0-120° of the emitting angle limits the using of the light emitting diode chip. Increasing the emitting angle of the light emitting diode chip is necessary.

BRIEF DESCRIPTION OF THE DRAWINGS

Implementations of the present technology will now be described, by way of example only, with reference to the attached figures.

DETAILED DESCRIPTION

Figure 1:
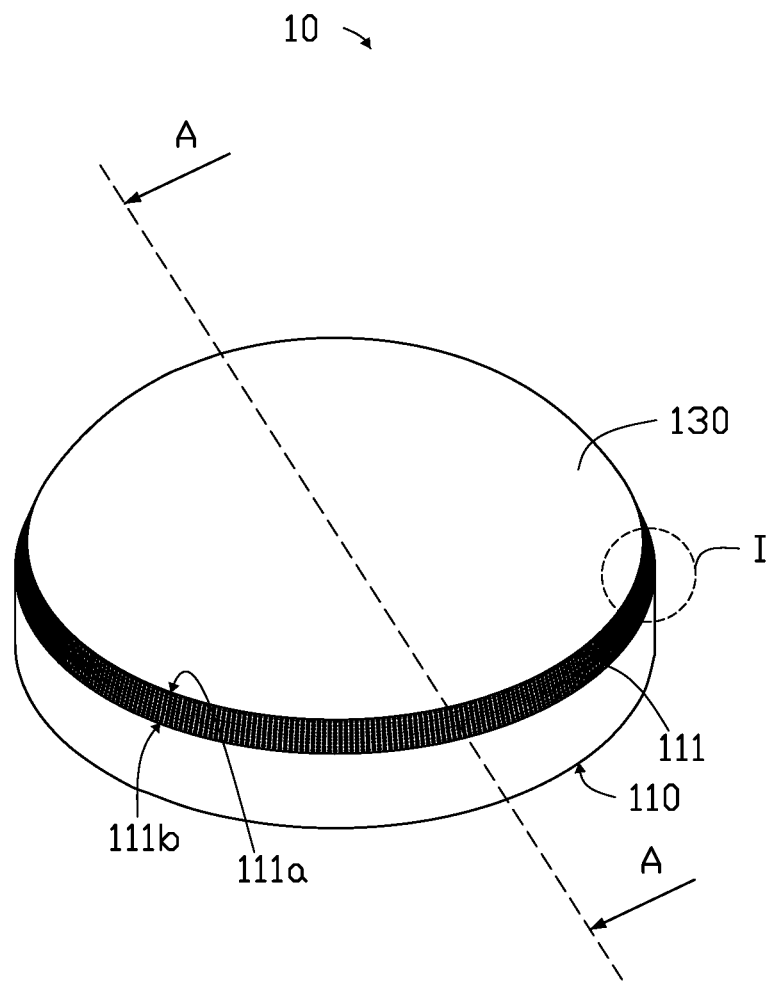
FIG. 1 is a space diagram of a light-spreading lens in accordance with an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

A light-spreading lens according to an embodiment comprises:

a bottom surface;

a light-in surface being defined in a center of the bottom surface and being recessed away from the bottom surface to form a receiving chamber;

a side surface being around the bottom surface and being perpendicular to the bottom surface;

a light-out surface extending from the side surface along a direction away from the bottom surface and having a periphery; and a micro structure portion being formed on the periphery of the light-out surface.

The light-spreading lens has an optical axis.

The light-spreading lens is rotationally symmetric about the optical axis.

The light-in surface is an ellipsoid surface.

The light-in surface is rotationally symmetric about the optical axis.

The side surface is rotationally symmetric about the optical axis.

The light-out surface is rotationally symmetric about the optical axis.

A recess is defined in a center of the light-out surface.

The recess is recessed from the light-out surface to the bottom surface.

The recess is rotationally symmetric about the optical axis.

The micro structure portion is rotationally symmetric about the optical axis.

The micro structure portion has a top end and a bottom end.

A height of the top end is larger than a distance from a peak of the light-in surface to the bottom surface.

The height of the bottom end is less than the distance from the peak of the light-in surface of the bottom surface.

A height of the top end is larger than a distance from a peak of the light-in surface to the bottom surface, and less than the distance from the peak of the light-in surface of the bottom surface.

The bottom end coincides with an intersecting line of the light-out surface and the side surface.

The micro structure portion comprises a plurality of micro grooves.

Figure 2:
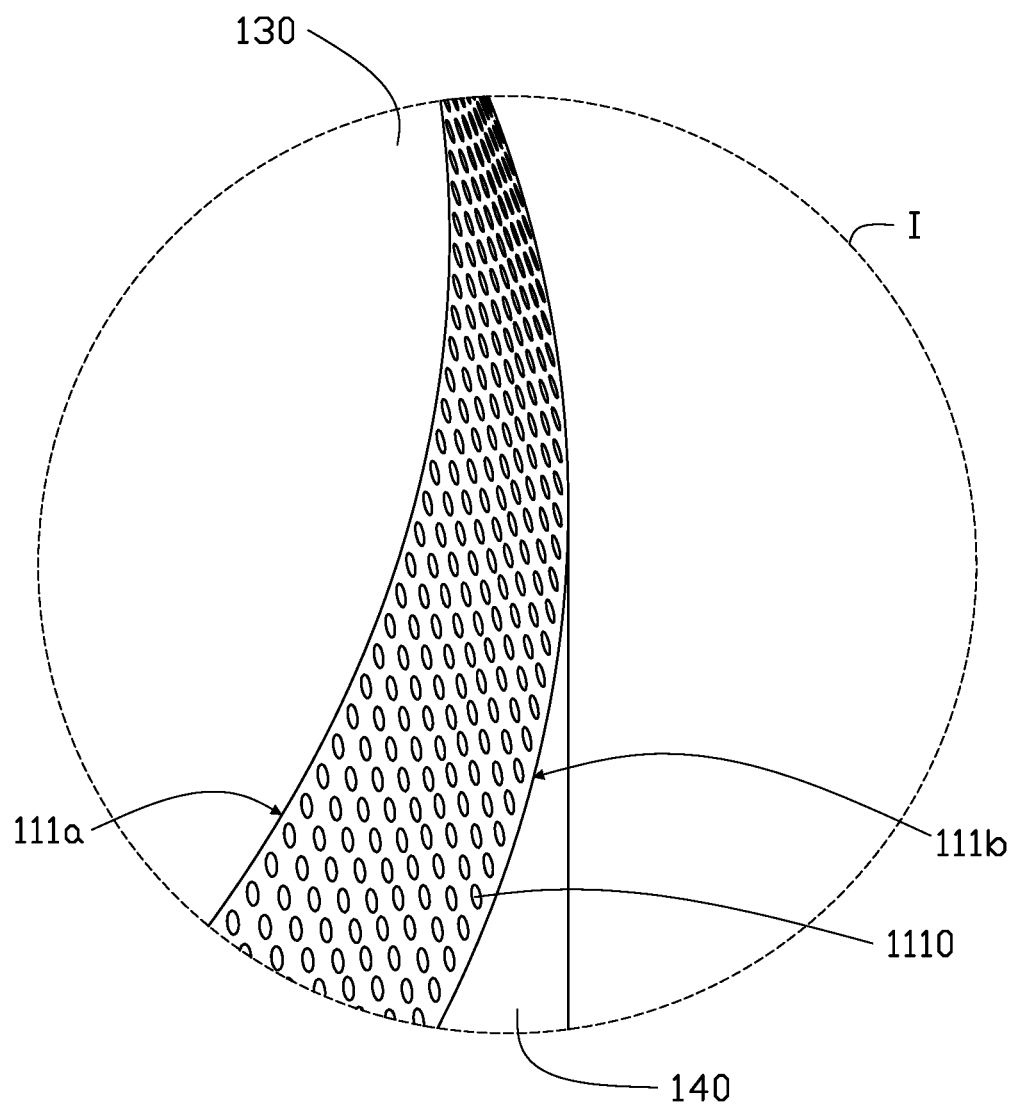
FIG. 2 is an enlarged view of circled area I of FIG. 1.
Figure 3:
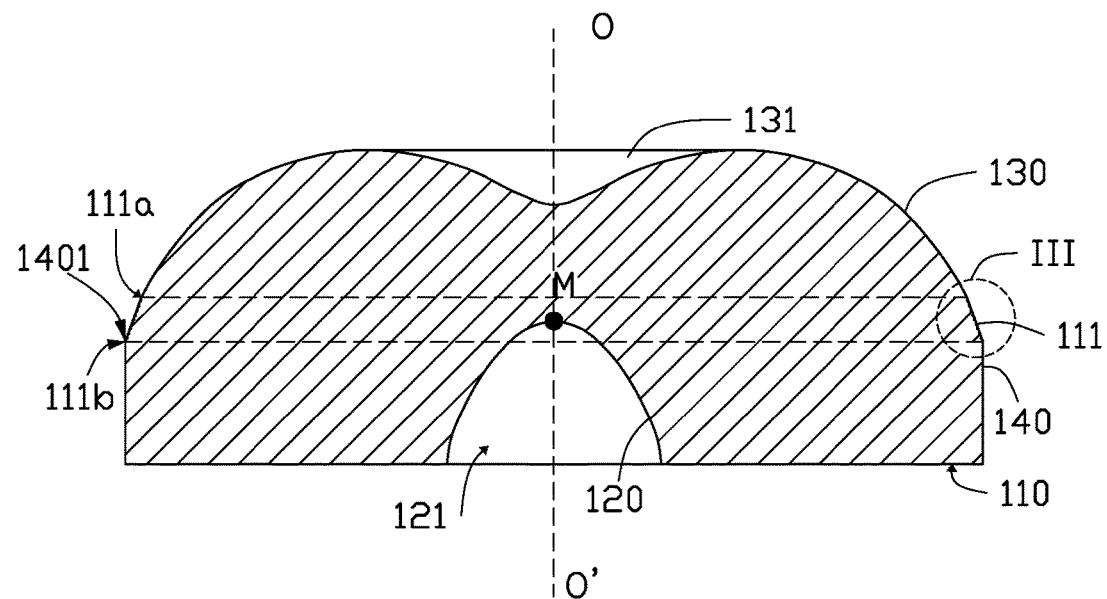
FIG. 3 is a section view along line A-A of FIG. 1.

Referring to FIGS. 1-3, a light-spreading lens 10 is provided. The light-spreading lens 10 comprises a bottom surface 110, a light-in surface 120, a side surface 140 and a light-out surface 130. The light-spreading lens 10 has an optical axis O-O'.

In this embodiment, the light-spreading lens 10 is rotationally symmetric about the optical axis O-O'.

The light-in surface 120 is defined in a center of the bottom surface 110. The light-in surface 120 is recessed away from the bottom surface 110 to form a receiving chamber 121. The light-in surface 120 can be an ellipsoid surface. The light-in surface 120 is rotationally symmetric about the optical axis O-O'.

The side surface 140 is around the bottom surface 110. The side surface 140 is perpendicular to the bottom surface 110. The side surface 140 is rotationally symmetric about the optical axis O-O'.

The light-out surface 130 extends from the side surface 140 along a direction away from the bottom surface 110. The light-out surface 130 is rotationally symmetric about the optical axis O-O'. A recess 131 can be defined in a center of the light-out surface 130. The recess 131 is in the out-light surface 130 and extends towards the bottom surface 110. The recess 131 is rotationally symmetric about the optical axis O-O'.

Figure 4:
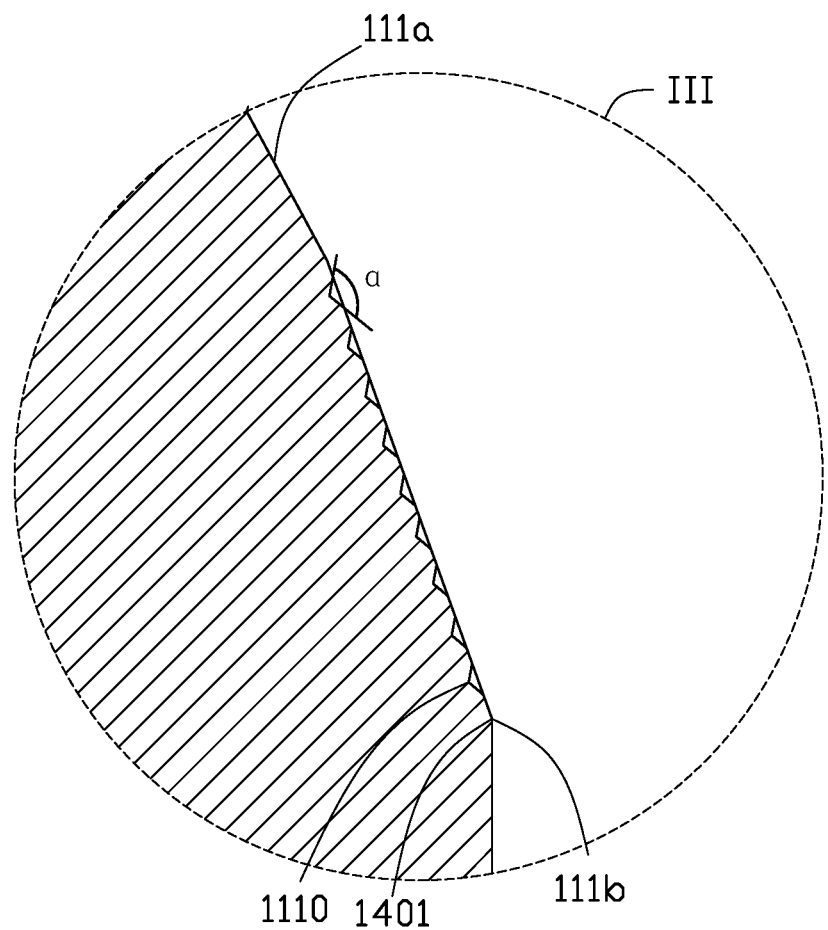
FIG. 4 is an enlarged view of circled area III of FIG. 3.

Referring to FIG. 4, a micro structure portion 111 is formed on the light-out surface 130 of the light-spreading lens 10. The micro structure portion 111 is on a periphery of the light-out surface 130 near the side surface 140. The micro structure portion 111 is rotationally symmetric about the optical axis O-O'.

The micro structure portion 111 has a top end 111a and a bottom end 111b. A height of the top end 111a is defined by a distance from the top end 111a to the bottom surface 110. A height of the bottom end 111b is defined by a distance from the bottom end 111b to the bottom surface 110. The height of the top end 111a is larger than a distance from a peak M of the light-in surface 120 to the bottom surface 110.

The height of the bottom end 111b is less than the distance from the peak M of the light-in surface 120 of the bottom surface 110.

In this embodiment, the bottom end 111b coincides with an intersecting line 1401 of the light-out surface 130 and the side surface 140. In other embodiments, the bottom end 111b does not coincide with the intersecting line 1401 of the light-out surface 130 and the side surface 140.

The micro structure portion 111 can comprise a plurality of micro grooves 1110. In this embodiment, each micro groove 1110 is a concave conical structure. An angle of a corner of the micro groove 1110 is 120°. In other embodiments, the angle of the corner of the micro groove 1110 can be 60°, 150° or 170°.

In other embodiments, each micro groove 1110 can be a concave truncated conical structure, a concave spheroidal structure or a concave standard pyrometric cone.

In other embodiments, each micro groove 1110 can be a convex conical structure, a convex truncated conical structure, a convex spheroidal structure or a convex standard pyrometric cone.

The micro groove 1110 can be made by laser.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A light-spreading lens comprising:
   a bottom surface;
   a light-in surface defined in a center of the bottom surface and being recessed from the bottom surface to form a receiving chamber;
   a side surface around the bottom surface and perpendicular to the bottom surface;
   a light-out surface extending from the side surface in a direction away from the bottom surface and having a periphery; and
   a micro structure portion formed on the periphery of the light-out surface, the micro structure portion connecting the side surface and the light-out surface, wherein the micro structure portion comprises a plurality of micro grooves recessed from the light-out surface, and each two adjacent micro grooves are spaced apart by portion of the light-out surface.

2. The light-spreading lens of claim 1, wherein the light-spreading lens has an optical axis.

3. The light-spreading lens of claim 2, wherein the light-spreading lens is rotationally symmetric about the optical axis.

4. The light-spreading lens of claim 2, wherein the light-in surface is rotationally symmetric about the optical axis.

5. The light-spreading lens of claim 2, wherein the side surface is rotationally symmetric about the optical axis.

6. The light-spreading lens of claim 2, wherein the light-out surface is rotationally symmetric about the optical axis.

7. The light-spreading lens of claim 2, wherein a recess is defined in a center of the light-out surface.

8. The light-spreading lens of claim 7, wherein the recess is in the out-light surface and extends towards the bottom surface.

9. The light-spreading lens of claim 7, wherein the recess is rotationally symmetric about the optical axis.

10. The light-spreading lens of claim 2, wherein the micro structure portion is rotationally symmetric about the optical axis.

11. The light-spreading lens of claim 10, wherein the micro structure portion has a top end and a bottom end.

12. The light-spreading lens of claim 11, wherein a distance from the top end to the bottom surface is greater than a distance from a peak of the light-in surface to the bottom surface.

13. The light-spreading lens of claim 11, wherein a distance from the bottom end to the bottom surface is less than a distance from the peak of the light-in surface to the bottom surface.

14. The light-spreading lens of claim 11, wherein the bottom end coincides with an intersecting line of the light-out surface and the side surface.

15. The light-spreading lens of claim 1, wherein the light-in surface is an ellipsoid surface.

16. The light-spreading lens of claim 1, wherein the plurality of micro grooves is arranged in arrays.

17. The light-spreading lens of claim 1, wherein each micro groove is a concave conical structure.

18. The light-spreading lens of claim 17, wherein a top angle of each micro groove is about 60 degrees, about 120 degrees, about 150 degrees, or about 170 degrees.

* * * * *